April 13, 1965   L. F. KAMP   3,178,721
CONTROL MECHANISM FOR MOTION PICTURE CAMERA
Filed Sept. 24, 1962   2 Sheets-Sheet 1

LEONARD F. KAMP
INVENTOR.

BY R. Frank Smith

ATTORNEYS

April 13, 1965 L. F. KAMP 3,178,721
CONTROL MECHANISM FOR MOTION PICTURE CAMERA
Filed Sept. 24, 1962 2 Sheets-Sheet 2

LEONARD F. KAMP
INVENTOR.

BY
ATTORNEYS 3,178,721
CONTROL MECHANISM FOR MOTION
PICTURE CAMERA
Leonard F. Kamp, Rochester, N.Y., assignor to Eastman Kodak Company, Rochester, N.Y., a corporation of New Jersey
Filed Sept. 24, 1962, Ser. No. 225,590
15 Claims. (Cl. 352—169)

The present invention relates to motion picture cameras, and more particularly to a selective control mechanism for such cameras.

Motion picture cameras are normally provided with a control button or trigger which will cause the camera to operate so long as it is pressed. However, it is frequently desired to expose a single frame, rather than a series of frames. Due to the relatively high speed of normal operation, it is virtually impossible to press and release the trigger quickly enough to insure that only one frame will be exposed.

An object of this invention is to provide a control mechanism including a manually operable trigger which will normally cause the camera to operate as long as the trigger is pressed, but which can be set so that only a single frame will be exposed for each actuation of the trigger.

Another object of this invention is to provide a control mechanism for a camera which includes means for positively holding the camera mechanism inoperative and the motor deenergized until the trigger is pressed.

Still another object of this invention is to provide an improved control mechanism for a motion picture camera that is constructed of relatively few inexpensive parts.

Other objects and a fuller understanding of the invention can be had by referring to the following description and claims taken in conjunction with the drawings in which:

To better understand the novel control mechanism described hereinbelow, a brief summary will be helpful. A pin carried by the rotating shutter of the motion picture camera describes a circular path about the axis of rotation of the shutter. An overcenter spring mechanism moves a pivotally mounted blocking mechanism into and out of the plane of rotation of the pin to control the movement of the shutter. The blocking mechanism includes a pair of overlying spring members normally biased to separate from each other and in which a catch member normally latches the spring members together for displacement as a unit. In the OFF position the blocking mechanism is toggled so that the rearmost spring member intersects the path of the plane of rotation of the pin of the shutter. In the RUN position, the blocking mechanism is toggled out of the path of the pin, and the pin and shutter are allowed to rotate as long as the blocking mechanism is retained out of the path of the pin. In SINGLE FRAME position, the blocking mechanism is limited in its toggled movement so as to release the shutter but so that the catch is not fully moved out of the path of the pin. Thus, rear the completion of one revolution, the pin engages and pivots the catch member to unlatch the spring members. The rearmost spring member thereupon moves to intersect the path of the pin and halt the movement of the shutter.

Figure 1:
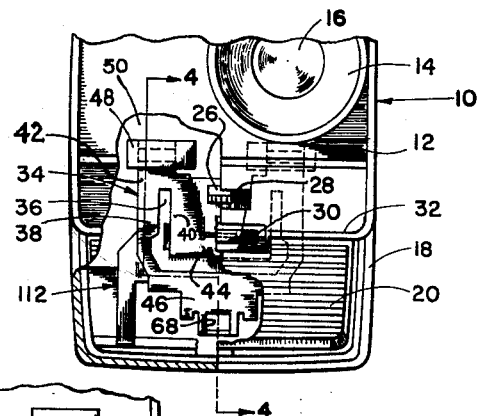
FIG. 1 is a fragmentary front view, partially in section, of a camera incorporating my invention.

Referring more particularly to FIG. 1 of the drawings, there is illustrated a motion picture camera housing 10 having a front wall 12 from which projects a circular light shield 14 adapted to surround the aperture 16 of an optical system (not shown). The lowermost portion 18 of housing 10 is offset rearwardly of front wall 12 to accommodate a trigger 20 which actuates mechanism for releasing a shutter blade 22 and energizing an electrical motor drive 24 (see FIG. 5) for rotating the shutter and actuating other mechanism (not shown) for moving a filmstrip past the aperture 16 of the optical system. A slide tab 26 projects through an aperture 28 outwardly from the front wall 12 of housing 10 and is mounted for limited lateral movement as will be described more fully hereinbelow. Beneath slide tab 26 there is located a trigger latch actuator handle 30 projecting through housing 10 in line with wall 32 which separates the lowermost portion 18 from front wall 12. Actuator 30 is adapted for vertical movement between two positions.

Figure 4:
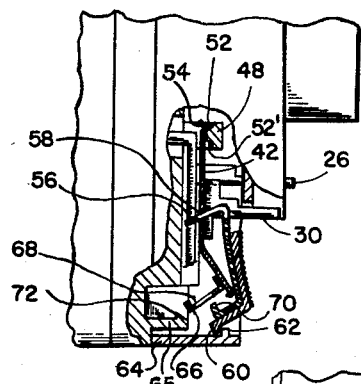
FIG. 4 is a partial cross sectional side view of the control mechanism taken along the line 4—4 of FIG. 1.

As best shown in FIGS. 1 and 4, trigger 20 is movably supported on housing 10 by means of a spring member 34. Spring member 34 has a U-shaped slot 36 located therein, defining a pair of U-shaped sections, legs 38 and 40 of which are joined together at their upper ends to form a pair of composite leg members 42 and the bight portions 44 and 46 of which are separated by the slot 36. As is best shown in FIGS. 1 and 4, leg members 42 are slideably received within channeled guides 48 formed on inner wall 50 of housing 10. Recesses 52 and 52' on the innermost wall of guides 48 co-operate with offset portions 54 of leg members 42 to detent spring member 34 into either its normal, raised position shown or a downwardly shifted position wherein, as later explained, it serves to latch the trigger 20 in a depressed condition. The previously mentioned actuator 30 is secured to the inner bight 44 of spring member 34 to shift the latter between these two positions.

As best shown in FIG. 4, a slotted tab member 56, the edge of which serves as a fulcrum for the trigger, is secured to the inner surface of trigger 20. The inner bight portion 44 of spring member 34 extends within the slot in tab 56 to hold the latter in proper position on the housing 10.

Outer bight portion 46 of spring member 34 is bent to engage the inner surface of trigger 20 so that trigger 20 is urged in a counterclockwise direction about its axis, as viewed in FIG. 4. A tab 60 on trigger 20 co-operates with a lip 62 on bottom wall 64 of the housing 10 to retain trigger 20 in this position against the force of spring member 34. Outer bight portion 46 of spring 34 further includes a generally rearwardly extending arm 66 having an aperture 68 centrally disposed therein which co-operates with a detent 72 located on the inner surface of wall 65 of camera housing 10, when spring member 34 is moved downwardly. Aperture 68 in arm 66 is also adapted to co-operate with a tab 70 secured to trigger 20 for latching the trigger to spring member 34 when the latter is itself thus latched to the housing 10. As arm 66 is formed from resilient material, such as spring steel, the actuator 30 can be slideably displaced downwardly to its latching position either before or after trigger 20 is depressed and in either event the aperture 68 of arm 66 will be positioned to engage detent 72 for retaining trigger 20 in a depressed position.

Figure 5:
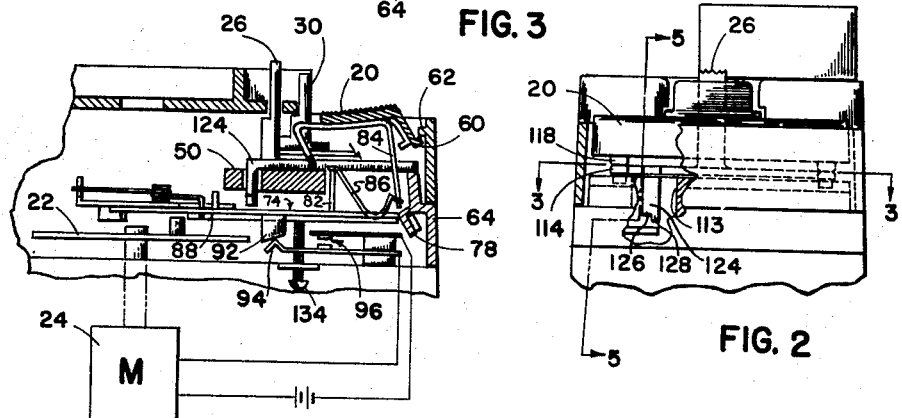
FIG. 5 is a cross sectional view of the control mechanism taken along the line 5—5 of FIG. 2.
Figure 6:
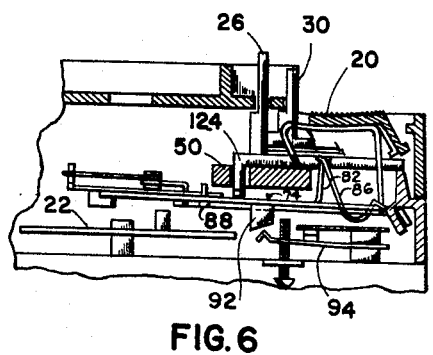
FIG. 6 is a cross sectional view similar to FIG. 5, showing the control mechanism releasing the shutter for movement.
Figure 7:
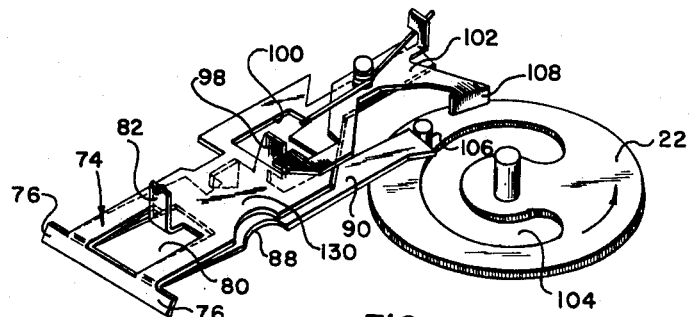
FIG. 7 is a fragmentary perspective view of the control mechanism cooperating with the shutter blade.

Referring to FIGS. 5, 6, and 7, there is shown a shutter blocking member 74 which is mounted for pivotal movement about ears 76 which are fulcrumed on a support 78 formed in the bottom wall 64 of housing 10. As best shown in FIGS. 5 and 7, blocking member 74 has a cutout 80 disposed therein and rearwardly extending projection 82 is formed at one edge of this cutout. An arm 84 (see FIG. 5) is secured adjacent tab 70 on trigger 20, which arm is adapted to be reciprocally moved into and out of cutout 80 when trigger 20 is manually actuated. A toggle spring 86, under compression, extends between the free ends of projection 82 and arm 84, thereby forming a snap action toggle mechanism for swinging the blocking member 74 about its fulcrum. Thus, as is well known in the art, when trigger 20 is depressed, toggle spring 86 will quickly pivot blocking member 74 about its pivot axis to move the free end of the blocking member forwardly away from the shutter 22. When trigger 20 is released, spring member 34 will move trigger 20 outwardly to its OFF position and toggle spring 86 will quickly move blocking member 74 back into its normal position as shown in FIG. 5.

A stop lever 88 is secured at its lower end to the rear face of blocking member 74. Stop lever 88, which has a stop arm 90 at its free end, is manufactured from a resilient material, such as spring steel, and is bowed so that its free end is urged away from member 74. A depending tab 92 is formed from one edge of stop lever 88 and, as shown in FIGS. 5 and 6, is adapted to co-operate with a spring-biased contact arm 94 of the motor control switch 96. Stop lever 88 also includes a tab 98 which is adapted to project through cutout 100 of blocking member 74 and into latching engagement with a spring-urged latch 102 pivotally carried on blocking member 74 and adapted to hold lever 88 in its retracted position relative to member 74.

Shutter blade 22 has the usual aperture 104 therein for allowing light passing through the optical system to expose an image area of the filmstrip (not shown) with each revolution of the shutter blade. A projection 106 is secured adjacent the periphery of the circular shutter blade 22 and is adapted to move in a circular path. Cam surface 108 of latch 102 and stop arm 90 of stop lever 88 are movable into the path of projection 106 under certain conditions as more fully described hereinbelow.

Cam surface 108 of latch 102 is canted relative to the circular path of movement of projection 106 so as to trip latch 102 when projection 106 engages it. It will be noted that stop arm 90 and cam surface 108 are spaced from each other and so positioned that pin 106 can be trapped therebetween. When thus trapped, shutter 22 will be held in rest position wherein exposure of the filmstrip will be prevented. It should also be noted that when the stop lever 88 is latched to member 74, cam surface 108 lies closer to the plane of the shutter than does stop arm 90.

As previously described, tab 92 normally engages contact arm 94 to separate the contacts of motor control switch 96. Tab 92 is so proportioned that when trigger 20 is depressed, and blocking member 74 moves forwardly as shown in FIG. 5, stop arm 90 will be displaced a distance great enough to release projection 106 somewhat before the contacts close the motor control switch 96. Similarly, movement of stop lever 88 in a clockwise direction will open the contacts of the motor control switch 96 before stop arm 90 intercepts the path of projection 106.

Figure 3:
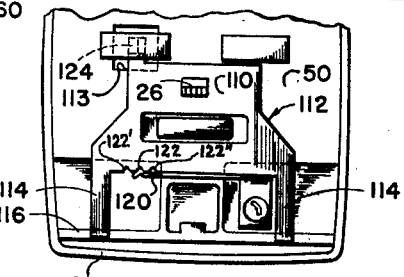
FIG. 3 is a cross sectional view of the control mechanism taken along the line 3—3 of FIG. 2.
Figure 2:
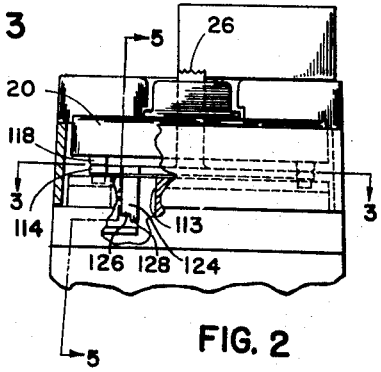
FIG. 2 is a bottom view partially in section showing the control mechanism in the OFF position.

Whether operation of trigger 20 to shift the blocking member 74 will result in a normal motion picture type of operation or a single frame exposure is determined by the position of slide tab 26. As best shown in FIGS. 2 and 3, slide tab 26 is carried on the bight portion 110 of a U-shaped slide member 112 which is adapted to move laterally on the face of inner wall 50 of housing 10. The outer ends of legs 114 of slide member 112 slideably move on inner lip 116 of bottom wall 64 and, in the middle, or LOCK position shown in FIG. 2, co-operate with projections 118 of trigger 20 to prevent the trigger from being depressed. A spring detent 120 co-operates with one of the three recesses 122, 122' and 122'', located on the lower surface of bight portion 110 to hold slide member 112 in any of three discrete positions, RUN, LOCK and SINGLE FRAME. Movement of slide member 112 to either of the two positions defined by the two outer recesses 122' or 122'', moves legs 114 out of the path of movement of projections 118 and thus allows trigger 20 to be depressed. A limit member 124, having two stepped abutment surfaces 126 and 128, respectively (see FIGS. 2, 5 and 6) is located adjacent one edge of slide member 112 and extends rearwardly through an opening 113 in the wall 50 to a point opposite the blocking member 74. Abutment surfaces 126 and 128 can be displaced laterally by selective moving slide tab 26 to one of its discrete positions, so that either of the abutment surfaces 126, 128, can be selectively positioned to co-operate with forward surface 130 of blocking member 74 to control the extent of its forward movement as more fully described hereinbelow. As shown in FIG. 5, an adjusting screw 134 carried by the housing, serves to control the normal, shutter-blocking position of blocking member 74.

To better understand the operation of the invention as shown in FIGS. 1–7, let us assume initially that slide tab 26 is moved to its intermediate position in which legs 114 of slide member 112 are located in the path of movement of projections 118 on trigger 20. The control mechanism is now in a LOCK position and the operator cannot depress trigger 20 to displace blocking member 74 so as to move stop lever 88 from the path of projection 106 of shutter 22.

If now the operator wishes to photograph a motion picture sequence, slide tab 26 is moved laterally to the right, as viewed in FIGS. 1, 2 and 3, which movement displaces legs 114 from the path of projections 118 on trigger 20, and allows the trigger to be depressed. Slide tab 26 is now in the RUN position and its rearwardly extending stop member 124 is moved to the right, thus positioning abutment surface 126 for engagement with the forward surface 130 of blocking member 74 when the latter is actuated.

When trigger 20, as shown in FIG. 5, is depressed, toggle spring 86 will quickly move blocking member 74 forwardly, which carries both the stop lever 88 and latch cam surface 108 therewith out of the path of projection 106 on shutter 22 to release the shutter and cause closing of the motor control switch 96 to start the camera. Operation of the camera will, therefore, continue so long as a force is exerted on trigger 20 to hold it depressed. As previously mentioned, if the operator desires to use the trigger latching feature, he may move trigger latch actuator handle 30 downwardly, either before or after trigger 20 is depressed. Spring member 34 will thereby be slideably displaced towards bottom wall 64 so that, when trigger 20 is depressed, aperture 68 of arm 66 will engage both detent 72 on wall 64 and tab 70 on the trigger 20 to retain the trigger in its depressed condition. To release the trigger, the operator need merely move selector handle 30 upwardly into its original position to free aperture 68 from detent 72 and tab 70.

Once the force is released from tigger 20, spring member 34 will urge trigger 20 to return to its normal position, thus moving the lower end of toggle spring 86 forwardly so that blocking member 74, with its stop lever 88 still latched thereto, will be quickly moved toward the plane of rotation of shutter blade 22.

The exact stopping action which will occur when the trigger is released will depend to some extent upon the particular time in the exposure cycle when such release occurs. If trigger release occurs appreciably before the shutter projection 106 nears the cam surface 108 of latch 102, the blocking member 74 together with its stop lever 88 will have returned as a unit to their normal position against the adjusting screw 134 before the cam surface is engaged by projection 106. Since the force exerted by toggle spring 86 is considerably greater than that due to the natural bowing of stop lever 88, when the shutter projection 106 finally engages cam surface 108, it will merely result in a quick release and reengagement of the latch 102 without any other effect. Stop lever 88 will, of course, already be in position to stop the shutter 22. If, on the other hand, the trigger 20 is not released until quite late in the operating cycle, blocking member 74 may well not have had sufficient time to reach its FIG. 5 position before latch 102 is tripped. The action then will be substantially like that which occurs during SINGLE FRAME operation as described herebelow. In either case however the apparatus will be stopped within that cycle during which the trigger is released.

For SINGLE FRAME operation selector tab 26 will be displaced laterally to the left so that the rearmost abutment surface 128 on stop member 124 will be in position to engage front surface 130 of blocking member 74 to limit pivotal movement of the latter when trigger 20 is depressed. Hence, movement of blocking member 74 will be limited, as shown in FIG. 6, to that sufficient to release shutter projection 106 from engagement with stop lever 88 but, insufficient to move cam surface 108 of latch 102 entirely clear of the path of rotation of projection 106. When shutter blade 22 then nears the end of one revolution, projection 106 will engage cam surface 108 of latch 102 and move the latch out of latching engagement with tab 98 on stop lever 88. Stop lever 88 will thus quickly be displaced rearwardly, by action of its own resilience, to deenergize the motor and to move stop member 90 into the path of projection 106 to halt further movement of shutter blade 22. When the trigger is then released, blocking member 74 will snap back to its FIG. 5 position, and, since stop lever 88 will be in engagement with adjusting screw 134, latch 102 will reengage tab 98 to once again latch lever 88 to blocking member 74.

Figure 8:
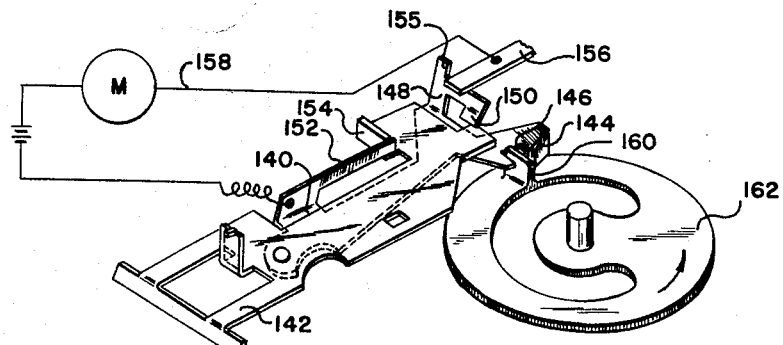
FIG. 8 is a fragmentary perspective view of another embodiment of the control mechanism.

Another embodiment of the control mechanism is illustrated in FIG. 8 in which the stop lever 140 is pivotally mounted on blocking member 142. Stop lever 140, which is made from a resilient material such as spring steel, has a cam surface 144 and a slot 146 located at its free end. Stop lever 140 is bowed so that its free end is urged away from blocking member 142. However, the free end of stop lever 140 includes a forwardly extending hook shaped arm 148 whose end 150 is adapted to releasably engage the free end of blocking member 142 to latch stop lever 140 in its normal, retracted position thereon as shown in FIG. 8. An edge of stop member 140 is blanked into an elongated leaf spring 152 which is adapted to co-operate with an ear 154 on blocking member 142 to urge stop member 140 in a clockwise direction (as viewed in FIG. 8) about its pivotal mounting. Leaf spring 152 also serves as a conductor for motor control circuit 158. A stationary contact arm 156 in the motor control circuit 158 is positioned on the camera housing forwardly of arm 148 and is adapted for engagement therewith. A forwardly projecting tab 155 on arm 148 co-operates with control arm 156 to limit clockwise movement of stop lever 140. Thus, in this embodiment the pivoted stop lever 140 not only serves as a switch element of the motor control circuit 158 but eliminates the need for a separate pivotal latch for retaining the blocking member and stop lever in engagement. Except for the above differences, this form is substantially like that previously described in conjunction with FIGS. 1–7.

The operation of this FIG. 8 embodiment is substantially similar to the operation of the previously described embodiment. The blocking member 142 and stop lever 140 are pivotally displaced by depressing a trigger mechanism such as was described hereinabove to first release projection 160 of shutter blade 162 from engagement with slot 146 and then engage arm 148 and contact arm 156 to close the motor control circuit 158. In the RUN position, blocking member 142 is displaced a sufficient distance to move cam surface 144 out of the path of projection 160 so as to allow the shutter 162 to rotate for any desired period of time. When the trigger is released, blocking member 142 and stop lever 140 are urged to return to their normal position. Arm 148 first separates from contact arm 156 to open motor control circuit 158 after which stop lever 140 and blocking member 142 are brought to their normal rest position against an adjusting screw (not shown). Projection 160 slideably engages cam surface 144 and pivots stop lever 140 in a counter-clockwise direction to release stop lever 140. However, because the force exerted by the toggle spring of the trigger mechanism (not shown) is considerably greater than the force of bowed stop lever 140, stop arm 148 of stop lever 140 is merely quickly released and then reengaged to blocking member 142.

For SINGLE FRAME operation, the pivotal movement of blocking member 142 and stop lever 140 will be limited as before described. When the trigger mechanism is depressed, slot 146 will be displaced a sufficient distance to release projection 160 after which arm 148 engages contact arm 156 to close motor control circuit 158. Cam surface 144, however, will remain in the path of rotation of projection 160 and when shutter blade 162 nears the ends of one revolution, projection 160 will pivot stop lever 140 in a counter-clockwise direction to unlatch arm 148 from blocking member 142 to first open motor control circuit 158 and then trap projection 160 in slot 146. Release of the trigger mechanism will reengage stop lever 140 to blocking member 144.

Figure 9:
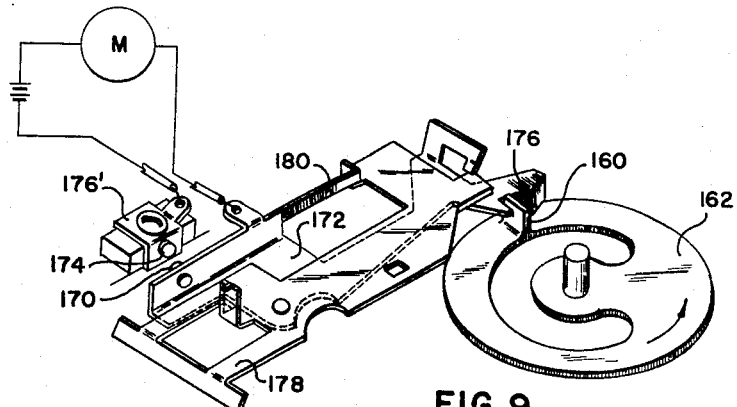
FIG. 9 is a fragmentary perspective view of still another embodiment of the control mechanism.

Still another embodiment is shown in FIG. 9 which is substantially similar to that shown in FIG. 8. In this form, a contact 170 is located near the lower end of stop lever 172, which contact is adapted to engage contact 174 of motor control switch 176'. When projection 160 is engaged in the slot 176 of lever 172, the contacts 170 and 174 will be held spaced slightly from one another as shown in FIG. 9. However, when blocking member 178 and stop lever 172 are pivotally moved to release projection 160 on shutter 162 in response to actuating the trigger mechanism (not shown), stop lever 172 will be moved in a clockwise direction by action of its spring arm 180 to close contacts 170 and 174. Return of blocking member 178 and stop lever 172 to their normal positions, for opening contacts 170 and 174 and for relatching the shutter 162 will be brought about substantially as described hereinabove to the embodiment of FIG. 8.

While the novel form of this invention has been disclosed with particular reference to the blocking mechanism coacting with a pin carried by the rotating shutter blade of the camera, it will be obvious that the blocking mechanism could be adapted to coact with any cyclically driven element of the camera.

The invention has been described in detail with particular reference to embodiments thereof, but it will be understood that variations and modifications can be effected within the spirit and scope of the invention as described hereinabove and as defined in the appended claims.

I claim:

1. In motion picture apparatus including a shutter blade which is cyclically driven by a single drive means from a rest position to an exposure position, the combination comprising:

(a) blocking means including a stop member and a cam member movable to and from a normal position in which said stop member releasably holds said shutter in its rest position and (b) selectively operable control means effective when actuated to selectively cause movement of said blocking means from said normal position to
  (1) a first operating position wherein both said stop member and said cam member lie outside of the path of said shutter for allowing said shutter to make successive exposures as long as said control means is actuated, and
  (2) a second operating position causing movement of said stop member out of the path of said shutter while said cam member remains in path of said shutter for allowing said shutter to make a single exposure, near the completion of which said cam member coacts with said shutter to cause said stop member to move into the path of said shutter for preventing further movement of said shutter, regardless of the length of time said control means is actuated.

2. The motion picture apparatus as in claim 1 in which said control means includes means selectively movable into the path of said movable blocking member for limiting the movement thereof from said normal position to either of said operating positions.

3. The motion picture apparatus as in claim 1 in which said control means includes an overcenter spring mechanism connected to said blocking member for rapidly moving said blocking member into and out of said normal position.

4. The motion picture apparatus as in claim 3 in which said spring mechanism includes a manually actuated trigger member for controlling said mechanism.

5. The motion picture apparatus as in claim 1 wherein said shutter blade is rotatably driven by an electric motor, and said blocking means includes means for completing an electric circuit through said motor after said stop member has been moved out of the path of said shutter.

6. The motion picture apparatus as in claim 1 in which said shutter blade moves substantially in a given plane and said cam member in either of said operating positions lies closer to said plane than does said stop member.

7. In motion picture apparatus including a shutter blade which is cyclically driven by a drive means from a rest position to an exposure position, the combination comprising:
  (a) a blocking member, carrying first and second members, said first member releasably retaining said second member in a predetermined position on said blocking member, said blocking member being movable to and from a normal position in which said second member releasably holds said shutter in its rest position, and
  (b) control means for moving said blocking member from said normal position to
    (1) a first position causing movement of said first and said second members out of the path of said shutter whereby said shutter can make successive exposures as long as said control means is actuated; and
    (2) a second position causing movement of said second member out of the path of said shutter while said first member remains in the path of said shutter for said shutter to make but a single exposure, near the completion of which said first member coacts with the shutter to cause release of said second member and movement thereof into the path of said shutter for releasably holding said shutter in its rest position, regardless of the length of time said control means is actuated.

8. The motion picture apparatus as in claim 7 in which said second member is biased away from said blocking member toward said shutter and said first member includes means for releasably latching said second member in retracted position relative to said blocking member for movement therewith.

9. The motion picture apparatus as in claim 8 in which said first member includes a cam surface positioned in the path of said shutter when the blocking member is in said second operating position for unlatching said second member from said blocking member to halt the rotation of said shutter blade.

10. The motion picture apparatus as in claim 7 in which said shutter blade includes a projection movable therewith, and said first member comprises a portion adapted to engage said projection to cam said first member in a direction to release said second member for movement independently of said blocking member.

11. The motion picture apparatus as in claim 7 in which said shutter blade includes a projection movable therewith, and said control means includes a movable trigger and means biasing said trigger towards an inoperative position for causing said blocking member to move from either of its operating positions to its normal position wherein said second member releasably holds said projection.

12. In a control mechanism for a motion picture camera including a shutter blade which is cyclically driven by a drive means from a rest position to an exposure position, the combination comprising:
  (a) a blocking member, including a stop member and a cam member, movable to and from a normal position in which said stop member releasably holds said shutter in its rest position;
  (b) a manually operated control means effective when actuated to selectively cause movement of said blocking member from said normal position to
    (1) a first operating position wherein both said stop member and said cam member lie outside of the path of said shutter for allowing said shutter to make successive exposures as long as said manually operated control means is actuated;
    (2) a second operating position causing movement of said stop member out of the path of said shutter while said cam member remains in the path of said shutter for allowing said shutter to make a single exposure, near the completion of which said cam member coacts with said shutter to cause said stop member to move into the path of said shutter for preventing further movement of said shutter, regardless of the length of time said manually operated control means is actuated; and
  (c) said control means including a selector means for establishing said first first and second positions.

13. The control mechanism as in claim 12 in which said manually operable control means includes a reciprocably movable operating member, and said selector means includes a selectively movable slide member having two distinct surfaces each surface being selectively positionable in the path of said blocking member to limit the movement thereof to said first and second positions respectively upon movement of said operating member.

14. In motion picture apparatus including a shutter blade which is cyclically driven by a drive means from a rest position to an exposure position, the combination comprising:
  (a) blocking means including a stop member and a cam member movable to and from a normal position in which said stop member releasably holds said shutter in its rest position;
  (b) actuating means effective when actuated to cause movement of said blocking means from said normal position to
    (1) a first operating position wherein both said stop member and said cam member lie outside of the path of said shutter for allowing said shutter to make successive exposures as long as said actuating means is held actuated; and
    (2) a second operating position causing movement of said stop member out of the path of said shutter while said cam member remains in the path of said shutter for allowing said shutter to make a single exposure, near the completion of which said cam member coacts with said shutter to cause said stop member to move into the path of said shutter for preventing further movement of said shutter, regardless of the length of time said actuating means is held actuated; and (c) selector means positionable for limiting the movement of said blocking member from said normal position to either of said operating positions upon actuation of said actuating means.

15. In motion picture apparatus including an element which is cyclically driven along a given path from a rest position:

(a) blocking means including a stop member and a cam member movable to and from a normal position in which said stop member releasably holds said element in its rest position and (b) selectively operable control means effective when actuated to selectively cause movement of said blocking means from said normal position to (1) a first operating position wherein both said stop member and said cam member lie outside of the path of said element for allowing said element to move along said given path as long as said control means is actuated, and (2) a second operating position causing movement of said stop member out of the path of said element while said cam member remains in the path of said element for allowing said element to make a single cycle, near the completion of which said cam member coacts with said element to cause said stop member to move into the path of said element for preventing further movement of said element, regardless of the length of time said control means is actuated.

References Cited by the Examiner
UNITED STATES PATENTS 2,082,074  6/37  Moomaw _____ 88—17

NORTON ANSHER, *Primary Examiner.*

WILLIAM MISIEK, *Examiner.*